Inventors
George H. Leek
and Raymond H. Rose
by Mawhinney & Mawhinney
Attorneys

June 3, 1947.   G. H. LEEK ET AL   2,421,510
VALVE MECHANISM OF FLUID-PRESSURE ENGINES
Filed April 29, 1944   3 Sheets-Sheet 2
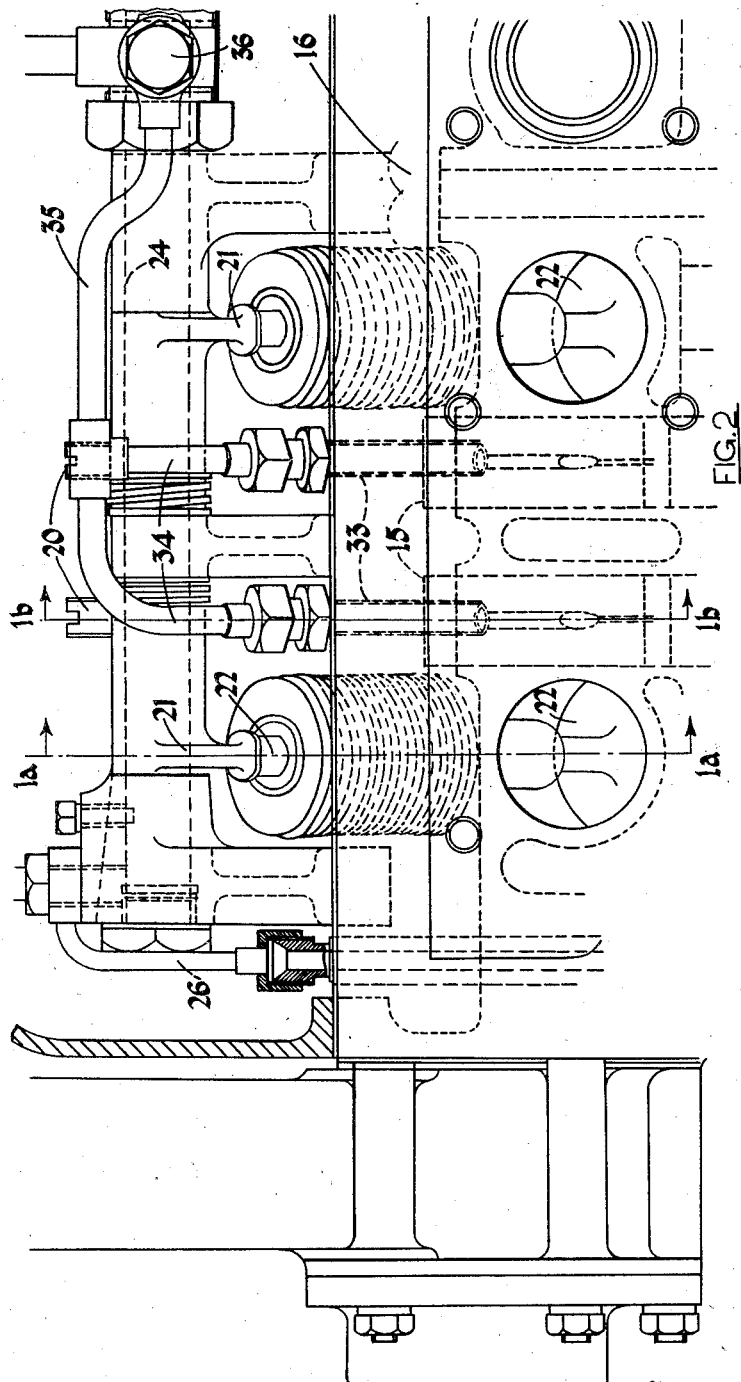
Inventors
George H. Leek
and Raymond H. Rose
by Mawhinney & Mawhinney
Attorneys

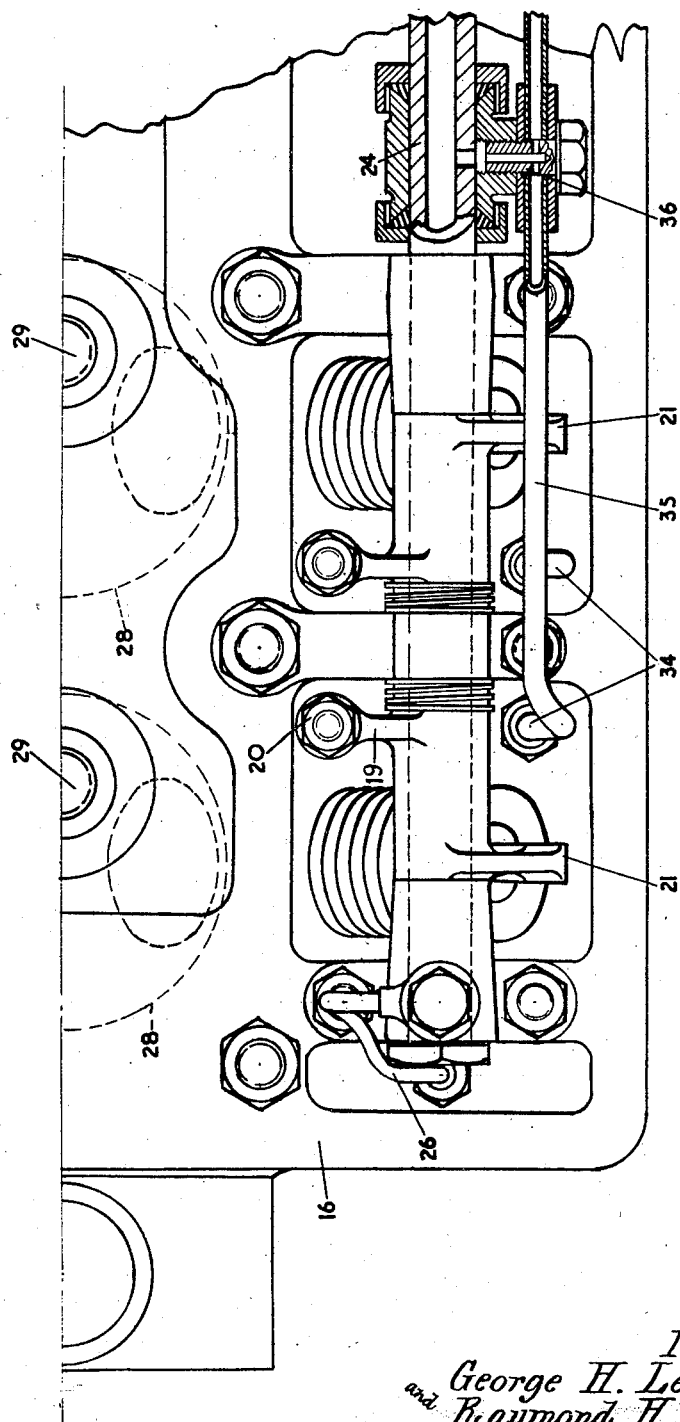

Patented June 3, 1947

2,421,510

UNITED STATES PATENT OFFICE 2,421,510

VALVE MECHANISM OF FLUID-PRESSURE ENGINES

George Harold Leek, Leamington Spa, and Raymond Hugh Rose, Wolverhampton, England Application April 29, 1944, Serial No. 533,428
In Great Britain March 14, 1944

4 Claims. (Cl. 123—90)

This invention relates to a fluid-pressure engine, particularly an internal-combustion engine, of the kind having rockers, for the inlet valves or for the exhaust valves, which are actuated by slidably-mounted tappets (usually through push rods) engaged with a cam shaft.

More particularly, the invention relates to an engine of the kind disclosed in British patent specification No. 449,099, having a high-up cam shaft carried by the cylinder block and able to actuate tappets which are slidably carried by the cylinder head.

It is one main object of the present invention to provide a hollow shaft upon which the rockers are mounted and which has lubricant fed through it under pressure (for example, to lubricate the rockers), and also to provide means for carrying off lubricant from the hollow shaft and for delivering it to tappets.

In a preferred arrangement, the tappets are hydraulic ones, having as operating liquid the lubricant supplied to them as aforesaid.

The invention further consists in a fluid-pressure engine having a high-up cam shaft carried by the cylinder block and able to actuate hydraulic tappets slidingly carried by the cylinder head, the tappets actuating the rockers.

For a better understanding of the invention reference should be directed to the accompanying drawings which illustrate one arrangement according to the invention.

In these drawings:

Figure 2 is a fragmentary elevation with certain casing parts of the engine removed.

Figure 3 is a fragmentary plan view of the engine and oiling pipe, the latter being broken away.

Figure 1:
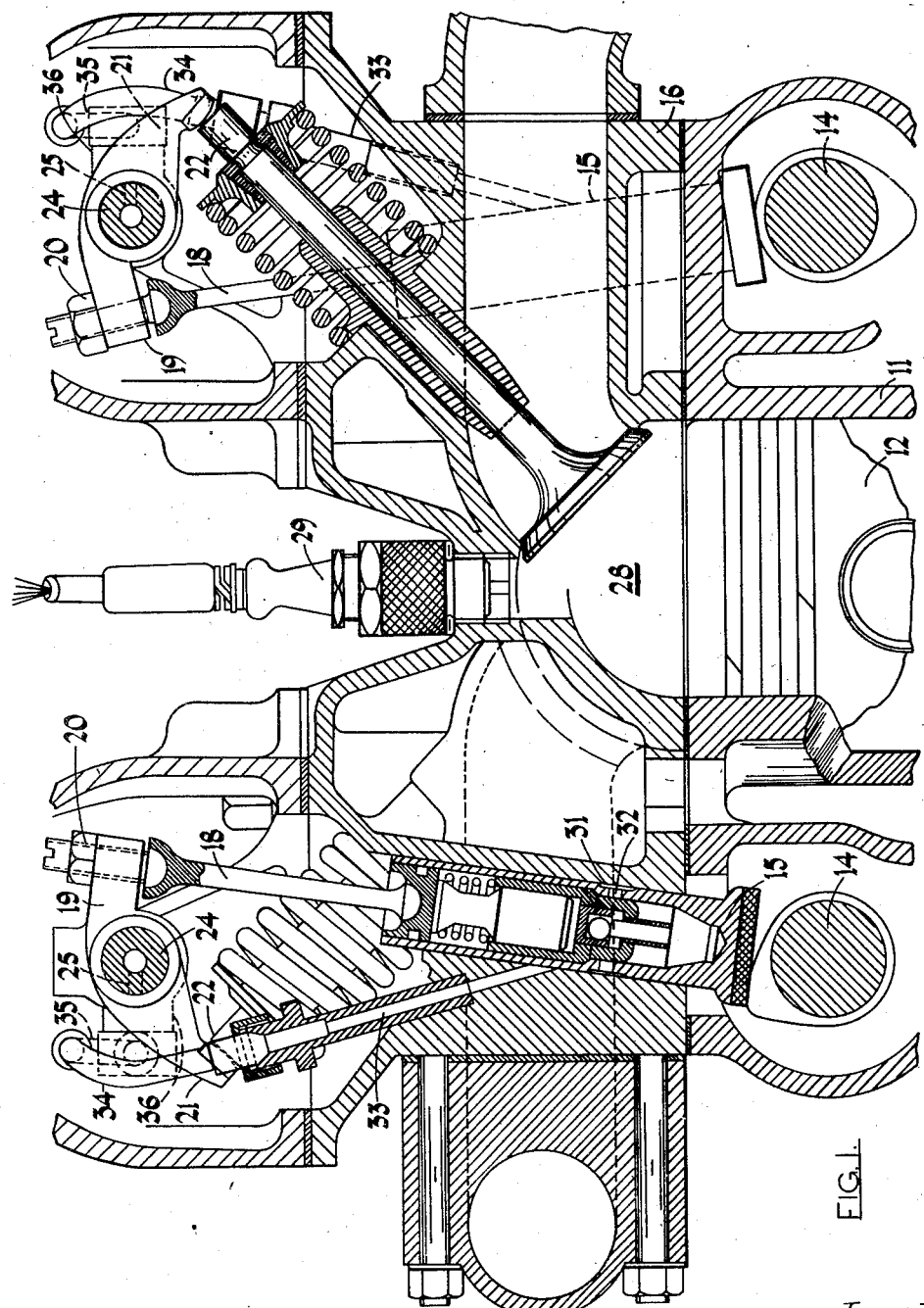
Figure 1 is a fragmentary cross-section, the right-hand half of the combustion chamber and cylinder bore, being a section approximately on the line 1a—1a, through the exhaust valve guide and the left-hand half a section approximately on the line 1b—1b, through the tappet of Figure 2.

The engine illustrated is one having four side-by-side cylinder bores formed in a cylinder block 11, and 12 represents one of the pistons. On one side of the engine is the valve gear of the exhaust valves, and on the other side the valve gear of the inlet valves. The two valve gears are substantially similar, and in the drawings corresponding parts are denoted by the same reference numerals.

On opposite sides of the cylinder block are cam shafts 14 which are mounted high up in the cylinder block, and associated with each cam shaft are tappets 15 slidingly mounted in the cylinder head 16. In the present instance, these tappets are hydraulic tappets of any appropriate kind, and as hydraulic tappets are well-known per se it is not believed necessary more fully to describe the particular form of hydraulic tappet shown.

Each hydraulic tappet communicates through a push rod 18 with one arm 19, through a means of adjustment 20, of a rocker, the other arm 21 of which is offset and engages the stem of the associated valve 22. The rockers on each side of the central plane through the cylinder bores are mounted on a hollow shaft 24 into the interior 24$^a$ of which lubricant is delivered under pressure in any known manner, and 25 represents a passage communicating with the interior of the bore of one of the hollow shafts 24 by which lubricant can be supplied to lubricate the rockers. 26 (Figure 2) is a passage by which lubricant delivered along the adjacent hollow shaft 24 can be supplied to a bearing for the adjacent cam shaft.

It will be observed that the combustion chamber (see Figure 1) is of part-spherical form with the inlet and exhaust valves inclined to the horizontal at 45°, and centrally of each combustion chamber 28 is a sparking plug 29.

In the present instance the external casings of the hydraulic tappets have peripheral grooves 31 in communication with the interiors of the tappet casings by radial passages 32, and lubricant is delivered thereto along the bores in which the tappet casings work by passages 33 supplied respectively from pipes 34. These pipes 34 communicate with a pipe 35 which in turn is connected at 36 in any convenient manner to be supplied from the interior of the associated hollow shaft 24.

With this arrangement we have a very efficient overhead valve engine with a most satisfactory form of combustion chamber, and we ensure the adequate supply of lubrication to the hydraulic tappets in a very simple manner.

What we claim as our invention and desire to secure by Letters Patent of the United States is:

1. In a fluid pressure engine, a cylinder block, a cylinder head, on the block, intake and exhaust valves in the head, hollow rock shafts in the head in communication with a source of lubricant supply, rockers on said shafts positioned to open said valves, hydraulic tappets mounted to reciprocate in said head and positioned to actuate said rockers, pipes external of said shafts, rockers and tappets for conveying lubricant from the hollow shafts to said tappets, and cam shafts in the upper portion of said cylinder block positioned to operate said tappets.

2. In a fluid pressure engine as claimed in claim 1, cylinders in the head for the tappets having lubricant passages communicating with said external pipes.

3. In a fluid pressure engine as claimed in claim 1, cylinders in the head for said tappets having diagonal lubricant passages communicating with said external pipes, said tappets having peripheral grooves adapted to move past the mouths of said passages and radial passages connecting with said grooves.

4. In a fluid pressure engine, a cylinder block, a cylinder head, valves in the head, a stationary hollow shaft in the head in communication with a source of lubricant supply, rockers freely mounted on said shaft and positioned to open said valves, ports in said shaft for carrying lubricant to said rockers, hydraulic tappets mounted to reciprocate in said head and positioned to actuate said rockers, pipes external of said shaft, rockers and tappets for conveying lubricant from said shaft, cylinders in the head for the tappets having lubricant passages communicating with said external pipes, and a cam shaft in the upper portion of said cylinder block positioned to operate said tappets.

GEORGE HAROLD LEEK.
RAYMOND HUGH ROSE.

REFERENCES CITED

The following references are of record in the file of this patent:

UNITED STATES PATENTS

| Number | Name | Date |
| --- | --- | --- |
| 2,116,749 | Daisley | May 10, 1938 |
| 1,624,497 | McAllister | Apr. 12, 1927 |
| 1,792,836 | Hardwerker | Feb. 17, 1931 |
| 2,145,484 | Johnson | Jan. 31, 1939 |
| 2,308,858 | Burkhardt | Jan. 19, 1943 |
| 1,877,051 | Read | Sept. 13, 1932 |

FOREIGN PATENTS

| Number | Country | Date |
| --- | --- | --- |
| 538,952 | Great Britain | Aug. 22, 1941 |
| 165,231 | Great Britain | 1921 |
| 121,410 | Great Britain | 1918 |